United States Patent [19]

Patriquin

[11] 3,973,654
[45] Aug. 10, 1976

[54] VISCOSITY SENSITIVE VALVE FOR SHOCK ABSORBER

[75] Inventor: William George Patriquin, Port Credit, Canada

[73] Assignee: Gabriel of Canada Limited, London, Canada

[22] Filed: Jan. 11, 1974

[21] Appl. No.: 432,782

[30] Foreign Application Priority Data
Mar. 15, 1973 Canada .............................. 166203

[52] U.S. Cl. ............................... 188/282; 188/320
[51] Int. Cl.² ............................................ F16F 9/34
[58] Field of Search .......... 188/282, 316, 317, 320, 188/322; 137/516.25

[56] References Cited
UNITED STATES PATENTS

| | | | |
|---|---|---|---|
| 2,394,356 | 2/1946 | Beecher | 188/320 |
| 2,507,266 | 5/1950 | Patriquin | 188/317 |
| 2,599,477 | 6/1952 | Patriquin | 188/320 |
| 2,603,231 | 7/1952 | Birkemeier | 137/516.25 |

FOREIGN PATENTS OR APPLICATIONS

| | | | |
|---|---|---|---|
| 1,242,350 | 8/1960 | France | 188/320 |
| 660,184 | 10/1951 | United Kingdom | 137/516.25 |

*Primary Examiner*—Stephen G. Kunin
*Assistant Examiner*—Edward R. Kazenske
*Attorney, Agent, or Firm*—Irvin A. Lavine

[57] ABSTRACT

A hydraulic shock absorber has a piston slidable in a pressure tube, and separating the tube into two chambers. The piston has a flow passage therein with an annular groove in the piston about an extremity of the passage. Transverse passages communicate the flow passage with the groove and the groove with one of the chambers. A spring urged valve extends over the groove and transverse passages, constricting fluid flow thereto until excess pressure displaces the valve and permits flow directly from the flow passage to the one chamber.

6 Claims, 8 Drawing Figures

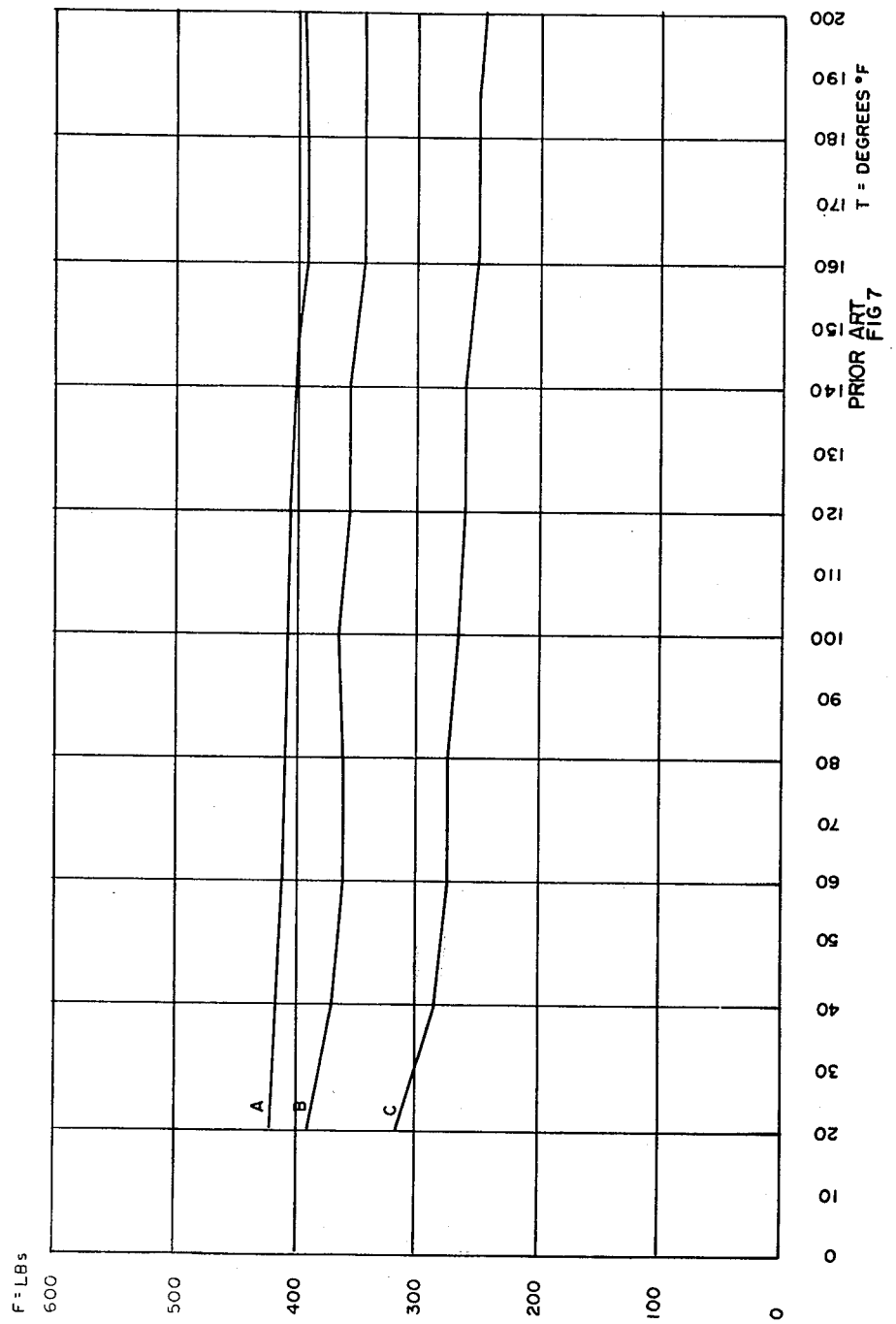
PRIOR ART FIG 7

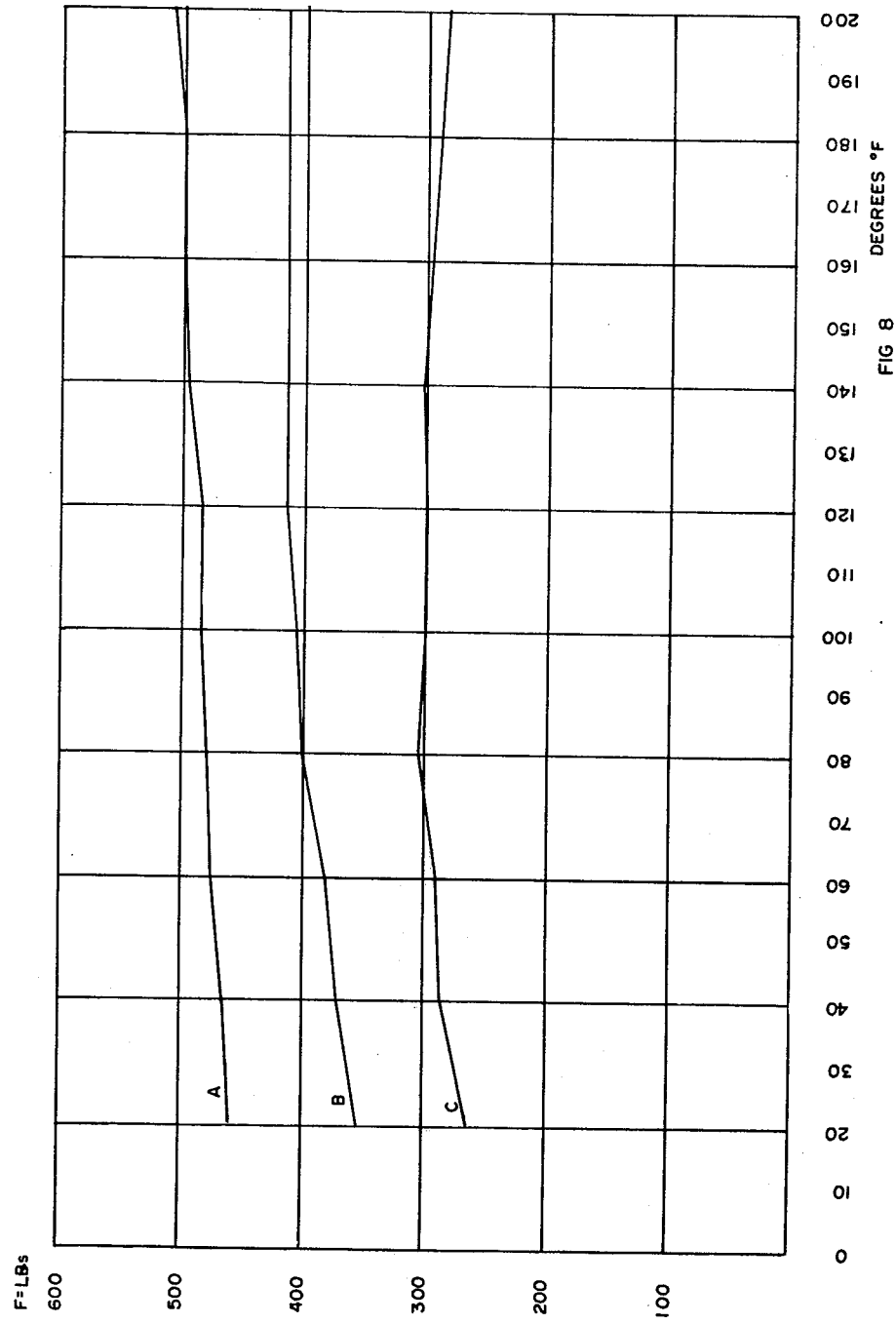

VISCOSITY SENSITIVE VALVE FOR SHOCK ABSORBER

This invention relates to a hydraulic shock absorber and more particularly to a valve mechanism therefor.

When hydraulic fluids of shock absorbers are subjected to changing environmental conditions they demonstrate different physical properties than those of an idealized Newtonian fluid; and hence cause different shock absorbing characteristics to be exhibited by a hydraulic shock absorber.

It is an object of the present invention to maximize the dynamic resistance of a shock absorber, at a given velocity, throughout the normal operating temperature range.

It is further an object of the invention to provide a variable control valve that will not only provide the proper resistance to take up normal shock but will provide an increased resistance for increased spring amplitudes in shock absorber movements under given conditions.

It is further an object of the invention to achieve a shock absorber relief valve system which will maintain the dynamic resistance of the shock absorber throughout its nominal temperature range.

The invention also contemplates means for varying the ratio of the blow-off areas or the ratio of the flow area of fluid according to predetermined resistance response.

The invention also as a result of a two stage flow of fluid during piston movement reduces fluid cavitation and hence inherent shock absorber noise resulting therefrom.

The invention therefore achieves in combination with a hydraulic shock absorber adapted to be connected between sprung and unsprung vehicle components, the shock absorber having a pressure tube, a piston slideable within said pressure tube and dividing the interior of said tube into jounce and rebound pressure chambers, said piston having fluid passage means constrained for the controlled flow of fluid from one of said chambers to the other of said chamber, said fluid passage means having fixed cross-sectional area, the improvement being a coaxial annular valve seat means positioned about and co-operating with said passage means, and transverse passage means communicating either side of said valve seat means, a valve element, a spring constructed and arranged to urge the valve element into effective covering engagement over said fluid passage means to constrict fluid flowing through said fluid passage means through said transverse passage means, said valve element adapted to be oppositely urged open by intense fluid pressure differential between compression chamber and decompression chamber.

The present invention will now be described by way of example with reference to the accompanying drawings in which:

FIG. 7 is a response curve of a shock absorber of the prior art.

FIG. 8 is a response curve of a shock absorber according to the present invention.

Figure 2:
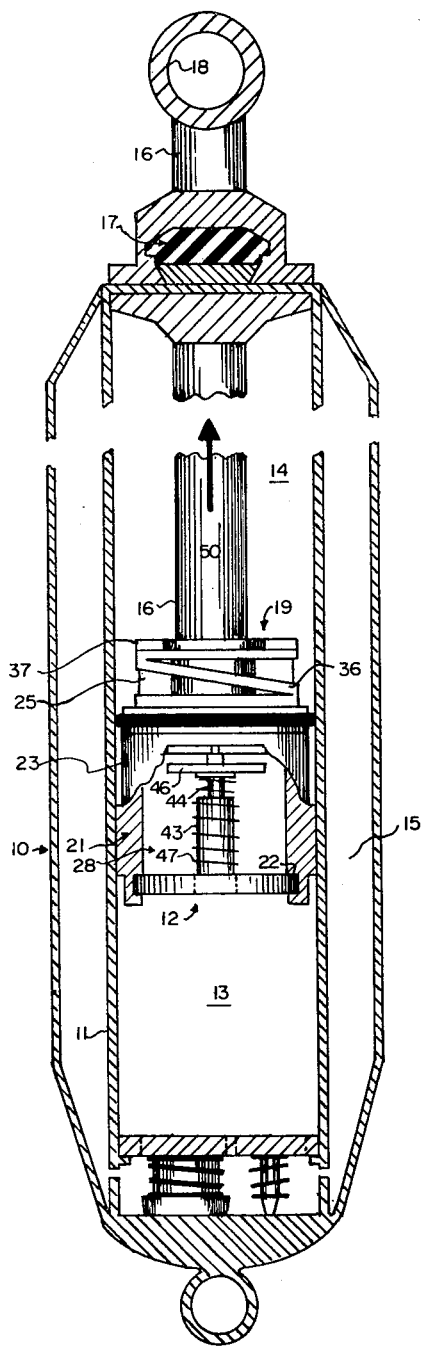
FIG. 2 is also a section in elevation of the shock absorber with piston partly in perspective, showing the valve means open.
Figure 1:
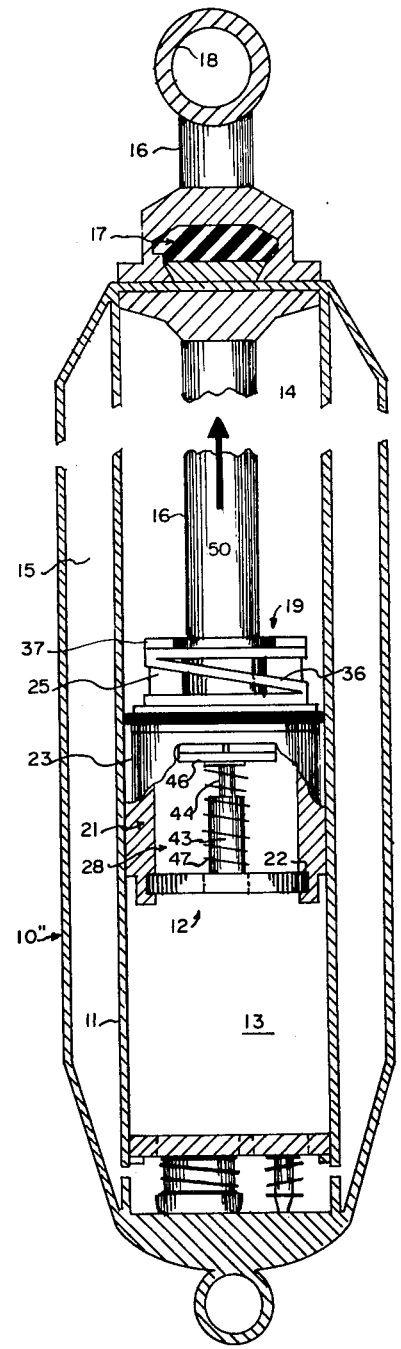
FIG. 1 is a section in elevation of the shock absorber but in partial perspective in relation to the piston showing the valve means closed.

Referring to FIGS. 1 and 2 a shock absorber 10 includes an inner housing or pressure tube 11 with inner movable piston 12 dividing the interior of the tube 11 into a compression chamber 13 and a decompression chamber 14. A circumscribing storage cavity 15 engulfs the pressure tube. The piston 12 includes a shank 16 extending through the top of the pressure tube 11 and through the packng seal 17 and terminating through the top of the storage cavity 15 to a connection orifice 18. To the other end of shank 16 the piston head means 19 is connected.

Figure 3:
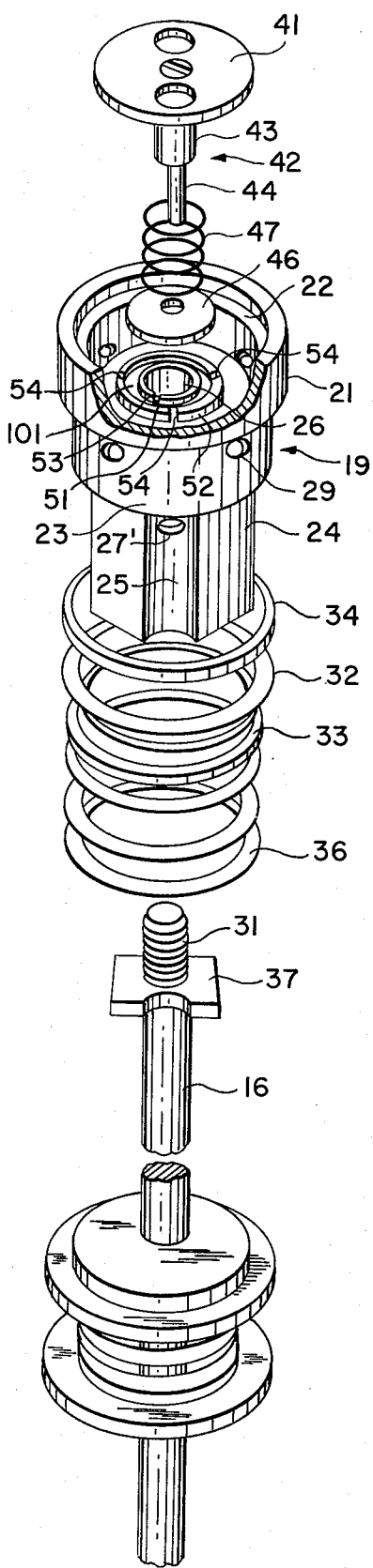
FIG. 3 is an exploded perspective of the components of the piston and valve means thereof.

Referring to FIG. 3, the piston head means 19 is essentially cylindrical in shape having a lower annular collar 21 with an internal circumscribing recess or seat 22, extending into a solid body portion 23 of reduced outer diameter and then into a fin-like appendage 24 of further reduced outer diameter, having about its circumference thereat, vertically disposed recesses or channels 25. Through the centre of the body portion 23 extends an axial passage 26 of fixed cross-section which communicates at one extremity with radial passages 27 each of which extend radially outward through the appendage wall into one of the vertically disposed circumferential recesses 25 and at its other extremity with a cavity 28 formed by the co-operation of the annular collar 21 and underlying body portion 23.

The appendage 24 threadingly mates with threads 31 of the end of the shank 16 remote of the orifice 18 whereby the cylindrical head means 19 is secured to the shank 16. In order to provide adequate sealing between piston 12 and the pressure tube 11 an elastomeric annular ring 32 is constrained about the appendage 24 surmounting the orifices 27' of the respective radial passage 27.

Figure 4:
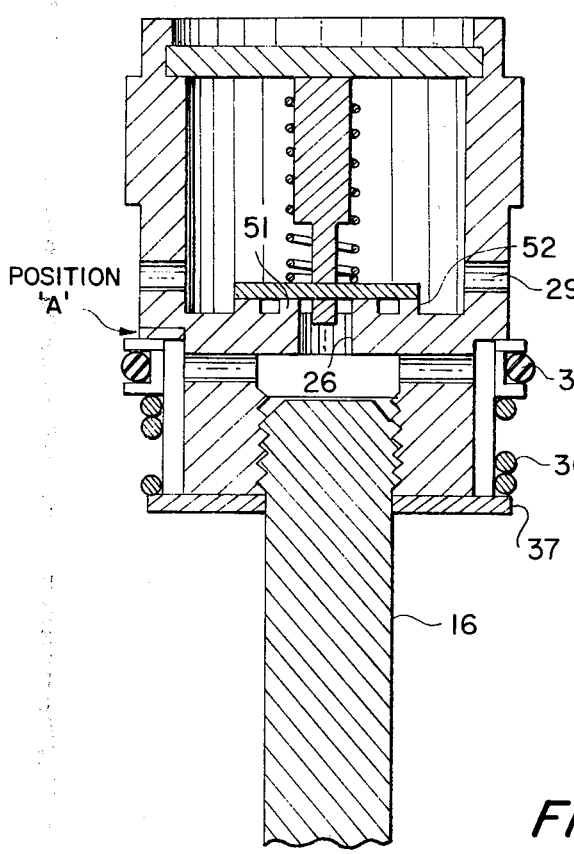
FIGS. 4 and 5 are respectively sections of the piston head of FIGS. 1 and 2.
Figure 5:
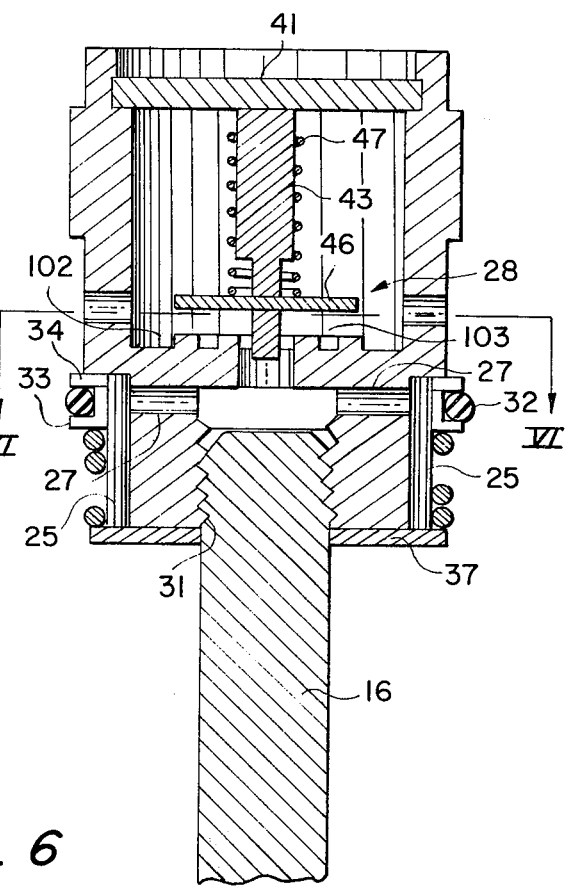

The elastomeric annulus 32 is mounted on a flanged annulus 33 and ring 34 and by co-operation of a constraining spring 36 and a body portion 23 urges the flanged annulus 33 and ring 34 toward each other to confine the cross-section of the elastomeric annulus 32. The constraining spring 36 is mounted about the shaft 16 and held in relative urging position by a retaining stop 37, which also mates with the threads 31. As such, the elastomeric annulus 32 acts, during the operation of the shock absorber 10, in a conventional manner as an additional valve, to open during the compression stroke, and to close during the decompression or rebound stroke and to respectively assume the positions as shown in FIGS. 1 and 2. During the compression stroke (opposite direction to arrow 50 of FIGS. 1 and 2) the annulus 32 together with the flange metal annulus 33 and ring 34 are disposed to a position A of FIG. 4 allowing fluid to flow between the piston head body portion 23 and the ring 34 to the recess 25 as well as through orifices 29 all of which controls the fluid pressure across the piston head 19. During compression of course, the urging of spring 36 assisted by the pressure differential of the oil between compression and decompression chambers constrains the elastomeric annulus 32 as shown in FIG. 4 and causes the oil to flow through, rather than around, the piston head means 19, in a manner as will be later described.

Returning to the structure of the piston head means 19, into the internal circumscribing seat 22 is secured an aperture disc member 41 with a centrally depending axis 42 of stepped outer diameter 43 and 44 having its lower extremity extending into the axial passage 26. A small valve means in the shape of a flat disc 46 is loosely mounted on the axis in region 44 and is urged away from the aperture disc member 41 by surmounted coil spring 47; as such, the valve disc 46 engages coaxial annular seats 51 and 52 disposed about the axial passage 26 on the floor of the internal cavity 28 and defining an annular groove between them. The seats 51 and 52 have a passage 53 and passages 54 extending across them respectively and the valve disc 46 is of a diameter at least equal to that of the outside diameter of the outer annular seat 52 and thus extends across both seats (FIGS. 1 and 4) to close the communication between the axial passage 26, save for the communication therewith through the passages 53 and 54 and the internal cavity 28 of the piston head 12.

In operation during the entire rebound stroke (direction of arrows 50 of FIGS. 1 and 2) the elastomeric annular ring 32 acts to seal the piston with the inner wall of the pressure tube 11 thus directing the fluid to flow through the recesses 25, radial channels 27, axial passage 26 and through the apertures 53 and 54 and hence to shunt across the annular seats 51 and 52 (depending upon the relative pressure on the annular recoil valve disc 46 as will be explained).

When the recoil valve disc 46 mates with the annular seats 51 and 52 during lower piston velocities the fluid which flows through the transverse passages or coined slots 53 and 54 respectively is restricted at two points; first by the coined slot 53 in the annular seat 51; and secondly by the slot or slots 54 in the annular seat 52. This results in unequal pressures in passage or port 26 and area or port 101. Naturally the pressure is greater, at all velocities, in passage or port 26. Therefore, the pressure drop across the annular valve seats is in two stages. This reduces cavitation on the exhaust side of the valve 46 or in internal cavity 28, which in turn reduces noise (swishing sound) at the lower piston velocities.

As the piston velocity increases, the fluid flow restriction through coined slots 53 and 54 increases, but not necessarily equally. As the restriction through each set of coined slots 53 and 54 increases, the pressure in passages or ports 26 and 101 increase also. Consequently the pressure in port 26 and the pressure in port 101 are both acting on recoil valve disc 46 in opposition to recoil valve spring 47.

Figure 6:
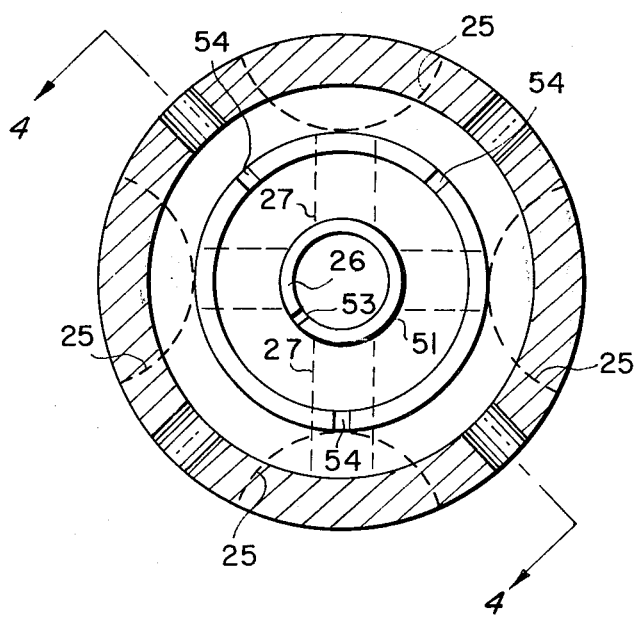
FIG. 6 is the section along lines VI—VI of FIG. 5.

When the combined pressure of fluid in port 26 and port 101 overcomes the opposing force acting on the recoil valve disc 46 by the recoil valve spring 47, the recoil valve disc 46 will gradually move away from the annular seats 51 and 52 (FIG. 6). While this transition takes place it will be noted that the flow areas 102 with respect to 103 are changing at different rates according to the flow area (being the circumference of the annular seat 51 or 52 multiplied by the radial distance the valve disc 46). It is the pressure differential generated by the flow areas that forces the disc from its annular seats 51 and 52, to cause the valve to initiate its second stage.

Therefore, it can be concluded that as the recoil disc valve 46 moves from its annular seats 51 and 52 the pressure or force contribution from area or port 101 is gradually diminishing, thus the area of disc valve 46 which is suject to effective pressure is gradually approaching the area of port 26 as the valve disc 46 moves away from seats 51 and 52 at higher piston velocities. Through normal piston velocities the fluid restriction through each set of coined slots 53 and 54 and also across annular seats 51 and 52 changes as the viscosity of the fluid changes. In fact as the fluid viscosity decreases with increasing fluid temperature, the fluid flowing between the seats 51 and 52 is able to escape quickly into cavity 28, that is, the coined slots 54 in the outer seat 51 will restrict a fluid of lower viscosity less than one of high viscosity. As a result, at higher fluid temperatures the outer blow-off area 101 contributes little pressure toward depressing the coil spring 47 and the only such effective area is that of transverse passage 26. This effect is beneficial in that it compensates for the losses in dampening force which would normally occur as a result of decreasing fluid viscosity. A decrease in fluid temperature, in a typical dampening device, will result in an undesired increase in dampening force due to increased fluid viscosity. In the valve arrangement of the present invention the two stage relief valve compensates for this particular condition by reducing the dampening force. At lower fluid temperatures, the fluid flowing between the annular recoil valve seat 51 and 52 cannot escape as freely from the annular area 101 between the respective seats and this supplements the pressure in the effective axial passage area 26 in depressing the coil spring 47. The result is that lower pressures in the pressure chamber 13 are required to open the relief valve 46. These lower working pressures produce the lower dampening forces to compensate for the increase fluid viscosity.

By judicial selection of the area of the axial passage 26 and the areas of the transverse passages 53 and 54 through the valve seats 51 and 52, together with manipulation of the urging force of the recoil valve spring 47, as well as the total area 101 of the blow-off or, with, or without manipulating the index of viscosity of the fluid of the shock absorber, the effective recoil resistance of the shock absorber can be controlled; each of these parameters may be independently varied to provide the desired dampening characteristics. For example, FIG. 8 shows a response curve of a shock absorber of the present invention where the oil used was conventional shock absorber fluid at various rebound velocities, A - 23.2 in/sec., B - 15.7 in/sec., C - 7.8 in/sec. When comparing the results of the present invention in FIG. 8 to those of FIG. 7 for the same rebound velocities A, B and C, substantially constant or increasing force over increasing operating temperatures created by the absorber of the present invention can be recognized as compared with decreasing force on increasing temperature of non-fluid viscosity sensitive valves of the prior art.

The embodiments of the invention in which an exclusive property or privilege is claimed are defined as follows:

1. In combination with a hydraulic shock absorber adapted to be connected between sprung and unsprung vehicle components, said absorber having a pressure tube, a piston slidable within said pressure tube dividing the interior of said tube into jounce and rebound pressure chambers, said piston having fluid passage means constrained for the controlled flow of fluid from one of said chambers to the other of said chambers, said fluid passage means having fixed cross-sectional area, the improvement being an annular groove means disposed about and cooperating with an extremity of said passage means, a first transverse passage means for communicating said annular groove means and said passage means, a second transverse passage means for communicating said groove means and the other of said chambers, a valve element extending over said annular groove means and said first and second transverse passage means, a spring urging the valve element into effective covering engagement over said first and second transverse passage means to constrict fluid flowing through said fluid passage means through said first and second transverse passage means, said valve element being urged to a valve open position by intense fluid pressure differential between said jounce and said rebound pressure chambers in which the valve open position fluid flows without significant restriction from said passage means to the other of said chambers through a space between said valve element and said passage means extremity while by-passing said first and second transverse passage means.

2. The hydraulic shock absorber of claim 1 wherein the transverse passage means have the cross-section of a coined slot.

3. The hydraulic shock absorber of claim 2 wherein there is a plurality of slots communicating between the groove means and said other chamber.

4. The hydraulic shock absorber of claim 2 wherein the slots and the annular groove means are integral to said piston.

5. The hydraulic shock absorber of claim 1 wherein the passage means is coaxial to the piston.

6. The hydraulic shock absorber of claim 1 wherein the cross-sectional area of the first transverse passage means is less than the cross-sectional area of said second transverse passage means.

* * * * *